US011427979B1

(12) United States Patent
Nelson (10) Patent No.: US 11,427,979 B1
(45) Date of Patent: Aug. 30, 2022

(54) PLOW COLLATERAL DAMAGE MITIGATING SYSTEM

(71) Applicant: Chris Lee Nelson, North East, PA (US)

(72) Inventor: Chris Lee Nelson, North East, PA (US)

( * ) Notice: Subject to any disclaimer, the term of this patent is extended or adjusted under 35 U.S.C. 154(b) by 402 days.

(21) Appl. No.: 16/746,907

(22) Filed: Jan. 19, 2020

(51) Int. Cl.
| *E01H 5/06* | (2006.01) |
| *B60Q 9/00* | (2006.01) |
| *B60Q 5/00* | (2006.01) |
| *H01B 11/18* | (2006.01) |
| *H04B 7/08* | (2006.01) |
| *B60K 35/00* | (2006.01) |

(52) U.S. Cl.
CPC ............. *E01H 5/066* (2013.01); *B60K 35/00* (2013.01); *B60Q 5/005* (2013.01); *B60Q 9/008* (2013.01); *H01B 11/1869* (2013.01); *H01B 11/1895* (2013.01); *H04B 7/08* (2013.01); *B60K 2370/152* (2019.05)

(58) Field of Classification Search
CPC .. E01H 5/066; B60K 35/00; B60K 2370/152; B60Q 5/005; B60Q 9/008; H01B 11/1869; H01B 11/1895; H04B 7/08
USPC .......................................................... 701/50
See application file for complete search history.

(56) References Cited

U.S. PATENT DOCUMENTS

| 1,475,878 | A | 11/1923 | Rellstab |
| 5,524,368 | A | 6/1996 | Struck et al. |
| 6,621,448 | B1 | 9/2003 | Lasky et al. |
| 6,640,468 | B2 * | 11/2003 | Menze ...................... E01H 5/06 37/234 |
| 6,705,028 | B2 * | 3/2004 | Hanafusa .................. E01H 5/04 37/246 |
| 7,100,312 | B2 * | 9/2006 | Wakitani ................... E01H 5/04 37/246 |
| 8,510,047 | B2 | 8/2013 | Lomes |
| 8,695,238 | B2 | 4/2014 | Warchola et al. |
| 9,113,300 | B2 | 8/2015 | Marti et al. |
| 10,084,556 | B1 | 9/2018 | Young et al. |
| 2002/0133981 | A1 * | 9/2002 | Menze ................ B60G 17/019 37/266 |
| 2005/0288007 | A1 | 12/2005 | Benco et al. |
| 2012/0174445 | A1 | 7/2012 | Jones et al. |
| 2015/0107135 | A1 * | 4/2015 | Fukano ..................... E01H 5/04 37/234 |
| 2017/0017234 | A1 | 1/2017 | Wilson |

* cited by examiner

*Primary Examiner* — Gertrude Arthur Jeanglaude
(74) *Attorney, Agent, or Firm* — The Law Office of Patrick F. O'Reilly III, LLC (57) ABSTRACT

A plow collateral damage mitigating system for the minimization of collateral damage done by otherwise routine and/or careless usage of a plow blade is disclosed herein. In one or more embodiments, the system includes a signal transmission cable configured to be disposed around a periphery of an area that is to be plowed; one or more receivers on a snow plow device or vehicle that are configured to receive at least one signal conveyed by the signal transmission cable; at least one actuator controlling an orientation of a plow blade of the snow plow device; and a control unit configured to automatically control the orientation of the plow blade by means of adjusting the at least one actuator based upon the at least one signal of the signal transmission cable so as to avoid damaging a boundary feature and/or obstruction disposed at the periphery of the area being plowed.

19 Claims, 6 Drawing Sheets

PLOW COLLATERAL DAMAGE MITIGATING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a plow collateral damage mitigating system. More particularly, the invention relates to an automatic plow collateral damage mitigating system for the purpose of minimizing damage caused by plowing activity, particularly to surrounding lawn, landscaping features, and obstructions, as well as to the equipment itself.

2. Background

In a typical plowing scenario, a snowplow operator arrives at the work site and usually operates the plow with it either in the fully up or down position. Generally, there are very few subtleties in snow plowing.

While watching for perimeter snow plowing stakes or other markers, the plow operator attempts to avoid obstructions. However, markers are often obliterated or knocked down with significant snowfall and cannot or will not be replaced during the winter season. Also, modern parking lots are commonly designed as more or less convoluted mazes, often with speed bumps and landscape features, or simply areas of grass, surrounded by curbs, in order to prevent speeding and corner cutting by drivers.

For purposes of safety, most surfaces are required to have complete snow removal with the blade in full contact with the supporting surface. For reasons of liability, especially in public parking lots, shoes or skids are not employed on the underside of the plow because they maintain a constant raised position of the plow blade above the surface upon which members of the public walk and drive, leaving residual snow behind. This is due to the fact that with subsequent plowing, the snow will continue to accumulate as the plow shoe or skid rides higher and higher upon the snow and ice that have been left behind and packed down after previous incomplete removal.

While in the full down position, the plow blade generally will be susceptible to damage if it hits any obstructions such as curbs, various substantial landscape features, or other hazards often associated with the parking or redirecting of vehicles. More commonly, however, the blade causes very substantial damage to surrounding soft landscape features, such as a lawn. Noticeable after the snow has melted is lawn/sod that has been peeled away from the margins of the driveway or parking lot. Often the damage is very substantial requiring sod replacement and/or re-seeding. Also, any non-fixed precast concrete parking devices such as turtles are often displaced from the parking surface onto the surrounding areas. This can cause substantial damage, displacement and disruption, which is costly and often physically demanding to repair.

It is very likely that most property owners would prefer not to have substantial damage done to their properties simply because 1 or 2 inches of snow have fallen. And yet substantial damage can be done to an otherwise well-maintained lawn in not more than just a few seconds with careless use of a piece of plowing equipment. Another variable may reside in the driver's seat of the plow vehicle as an operator may be forced to care for a site with which he or she is unfamiliar due to sickness, absence or injury on the part of the regular driver.

Therefore, what is needed is a plow collateral damage mitigating system that mitigates the damage described above, particularly to surrounding lawn, landscaping features, and obstructions, as well as to the equipment itself. Moreover, there is a need for a plow collateral damage mitigating system that allows for variably automatic elevating, tilting, pivoting, or other mechanical manipulation of a plow blade attached to a vehicle. Furthermore, there is a need for a plow collateral damage mitigating system that allows for visual cues and/or audio cues for the operator to supplement and/or replace border/obstruction/hazard-marking devices, such as stakes that may be damaged or knocked down during the snow fall season.

BRIEF SUMMARY OF EMBODIMENTS OF THE INVENTION

Accordingly, the present invention is directed to a plow collateral damage mitigating system that substantially obviates one or more problems resulting from the limitations and deficiencies of the related art.

In accordance with one or more embodiments of the present invention, there is provided a plow collateral damage mitigating system that includes a signal transmission cable configured to be disposed around a periphery of an area that is to be plowed by a snow plow device, the signal transmission cable including at least one signal wire, the at least one signal wire configured to convey at least one signal originating from a signal transmitter disposed in or proximate to the area; one or more receivers configured to be coupled to the snow plow device or a vehicle on which the snow plow device is mounted, the one or more receivers configured to receive the at least one signal conveyed by the at least one signal wire of the signal transmission cable; at least one actuator controlling an orientation of a plow blade of the snow plow device; and a control unit operatively coupled to the one or more receivers and the at least one actuator, the control unit configured to automatically control the orientation of the plow blade of the snow plow device by means of adjusting the at least one actuator based upon the at least one signal of the signal transmission cable so as to avoid damaging a boundary feature and/or obstruction disposed at the periphery of the area being plowed.

In a further embodiment of the present invention, the at least one actuator controls the orientation of the plow blade of the snow plow device by lifting one end of the plow blade so as to avoid damaging the boundary feature and/or obstruction disposed at the periphery of the area being plowed.

In yet a further embodiment, the plow collateral damage mitigating system further comprises a wheel disposed below, and connected to the at least one actuator. The at least one actuator and the wheel are disposed proximate to the one end of the plow blade.

In still a further embodiment, the at least one actuator controls the orientation of the plow blade of the snow plow device by lifting the entire plow blade so as to avoid damaging the boundary feature and/or obstruction disposed at the periphery of the area being plowed.

In yet a further embodiment, the at least one actuator controls the orientation of the plow blade of the snow plow device by rotating the entire plow blade in a transverse plane so as to avoid damaging the boundary feature and/or obstruction disposed at the periphery of the area being plowed.

In still a further embodiment, the signal transmission cable further comprises a shielding layer circumscribing the at least one signal wire, the shielding layer configured to prevent an electromagnetic field from escaping exteriorly from the signal transmission cable; and an outer protective layer circumscribing the shielding layer, the outer protective layer configured to prevent damage to the shielding layer and the at least one signal wire. One or more portions of the outer protective layer and the shielding layer are configured to be selectively removed by a user so as to enable the electromagnetic field emanating from the signal transmission cable to be varied.

In yet a further embodiment, the signal transmission cable comprises a helical bundle of cables so that exposed signal wire electromagnetic field emissions are not significantly blocked by adjacent intact portions of the outer protective layer and the shielding layer.

In still a further embodiment, the outer protective layer of each cable in the helical bundle of cables is color-coded depending on the boundary feature and/or obstruction being protected; and the boundary feature and/or obstruction is selected from a group consisting of: (i) dirt, (ii) grass, (iii) a curb, (iv) rocks, and (v) combinations thereof.

In yet a further embodiment, the one or more receivers comprise one or more receiver antennas mounted on top of the plow blade proximate to at least one end of the plow blade or the middle of the plow blade, the one or more receiver antennas configured to wirelessly receive the at least one signal conveyed by the at least one signal wire of the signal transmission cable.

In still a further embodiment, the at least one actuator comprises a hydraulic actuator controlling the orientation of the plow blade of the snow plow device.

In yet a further embodiment, the control unit is located in a cab of the vehicle on which the snow plow device is mounted.

In still a further embodiment, the control unit comprises a visual display device, the control unit is further configured to graphically display the orientation of the plow blade of the snow plow device on the visual display device.

In yet a further embodiment, the control unit is configured to operate both in a first automatic mode where the orientation of the plow blade of the snow plow device is controlled based upon the at least one signal of the signal transmission cable, and in a second manual override mode where the orientation of the plow blade of the snow plow device is able to be manually adjusted by an operator of the snow plow device.

In still a further embodiment, the control unit comprises a visual display device, and the control unit is configured to identify the area that is to be plowed by Global Positioning System (GPS) coordinates of the area, and to display a graphical representation of the area that is to be plowed on the visual display device.

In yet a further embodiment, the plow collateral damage mitigating system further comprises at least one video or audio-based output device configured to display at least one visual cue or transmit at least one audial cue to an operator of the snow plow device regarding the boundary feature and/or obstruction disposed at the periphery of the area being plowed; and the control unit is further configured to direct the at least one video or audio-based output device to display the at least one visual cue or transmit the at least one audial cue based upon the at least one signal of the signal transmission cable so as to prevent the operator from damaging the boundary feature and/or obstruction disposed at the periphery of the area with the snow plow device.

In accordance with one or more other embodiments of the present invention, there is provided a plow collateral damage mitigating system that includes a signal transmission cable configured to be disposed around a periphery of an area that is to be plowed by a snow plow device, the signal transmission cable including at least one signal wire, the at least one signal wire configured to convey at least one signal originating from a signal transmitter disposed in or proximate to the area; one or more receivers configured to be coupled to the snow plow device or a vehicle on which the snow plow device is mounted, the one or more receivers configured to receive the at least one signal conveyed by the at least one signal wire of the signal transmission cable; at least one video or audio-based output device configured to display at least one visual cue or transmit at least one audial cue to an operator of the snow plow device regarding a boundary feature and/or obstruction disposed at the periphery of the area being plowed; and a control unit operatively coupled to the one or more receivers and the at least one video or audio-based output device, the control unit configured to direct the at least one video or audio-based output device to display the at least one visual cue or transmit the at least one audial cue based upon the at least one signal of the signal transmission cable so as to prevent the operator from damaging the boundary feature and/or obstruction disposed at the periphery of the area with the snow plow device.

In a further embodiment of the present invention, the at least one video or audio-based output device comprises a visual display device, and the control unit is further configured to display a graphical representation of the snow plow device and the area that is to be plowed on the visual display device to visually notify the operator as to the proximity of a plow blade of the snow plow device to the boundary feature and/or obstruction.

In yet a further embodiment, the at least one video or audio-based output device comprises a speaker device, and the control unit is further configured to emit a sound of variable volume, frequency and/or tone from the speaker to audibly notify the operator as to the proximity of a plow blade of the snow plow device to the boundary feature and/or obstruction.

In still a further embodiment, the one or more receivers comprise one or more receiver antennas mounted on top of the plow blade proximate to at least one end of the plow blade or the middle of the plow blade, the one or more receiver antennas configured to wirelessly receive the at least one signal conveyed by the at least one signal wire of the signal transmission cable.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

There has thus been outlined above, rather broadly, some of the features of the invention in order that the detailed description may be better understood, and in order that the present contribution to the art may be better appreciated. There are additional features of the invention that will be described hereinafter.

In this respect, before explaining one or more illustrative embodiments of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description, and should not be regarded as limiting.

Figure 10:
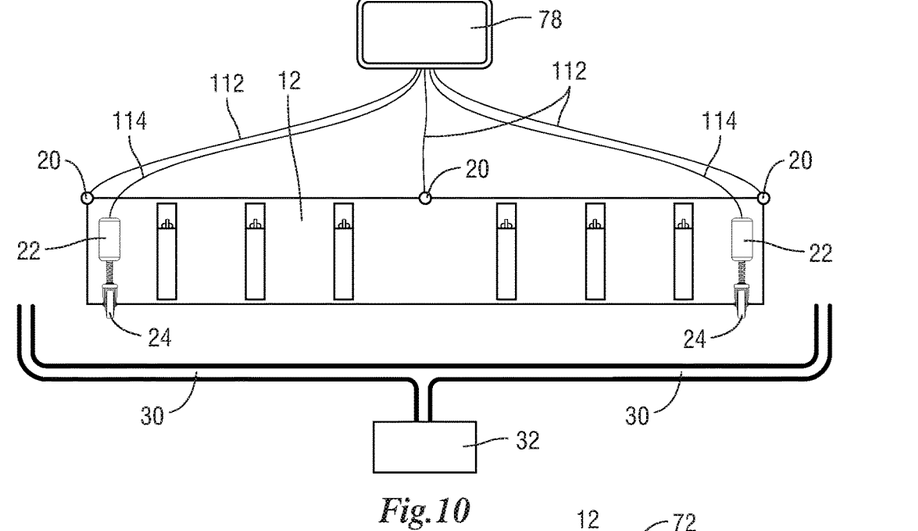
FIG. 10 illustrates the major components of the illustrative embodiment of the plow collateral damage mitigating system in schematic form.

The major components of an illustrative embodiment of a plow collateral damage mitigating system are schematically illustrated in FIG. 10. As shown in the schematic representation of FIG. 10, the plow collateral damage mitigating system generally comprises a signal transmission cable 30 configured to be disposed around a periphery of an area that is to be plowed by a snow plow device, the signal transmission cable 30 including at least one signal wire, the at least one signal wire configured to convey at least one signal originating from a signal transmitter 32 disposed in or proximate to the area; one or more receivers 20 configured to be coupled to the snow plow device or a vehicle on which the snow plow device is mounted, the one or more receivers 20 configured to receive the at least one signal conveyed by the at least one signal wire of the signal transmission cable 30; at least one actuator 22 controlling an orientation of a plow blade 12 of the snow plow device; and a control unit 78 operatively coupled to the one or more receivers 20 and the at least one actuator 22, the control unit 78 configured to automatically control the orientation of the plow blade 12 of the snow plow device by means of adjusting the at least one actuator 22 based upon the at least one signal of the signal transmission cable 30 so as to avoid damaging a boundary feature and/or obstruction disposed at the periphery of the area being plowed.

Turning now descriptively to the drawings of the illustrative embodiment, in which similar reference characters denote similar elements throughout the views, the figures illustrate vertical orientation mechanisms, a transverse plane orientation mechanism, perimeter control devices, and control unit or control module.

1. Vertical Orientation Mechanisms

Figure 2:
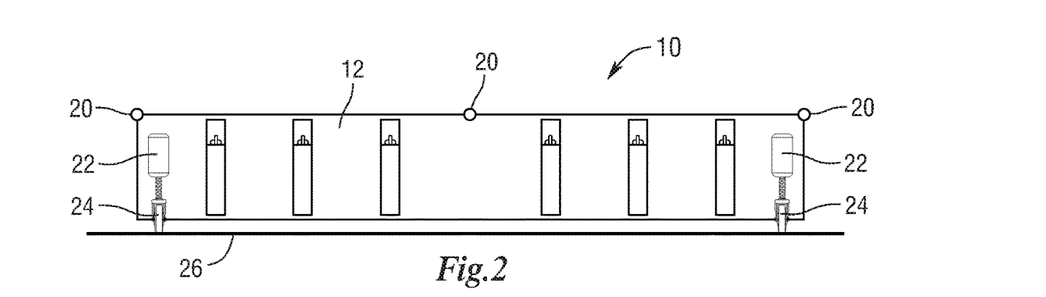
FIG. 2 is a rear elevational view of a snow plow device with a receiver antenna at each end, and in the middle, of a non-articulated plow blade, according to one illustrative embodiment of the plow collateral damage mitigating system.
Figure 3:
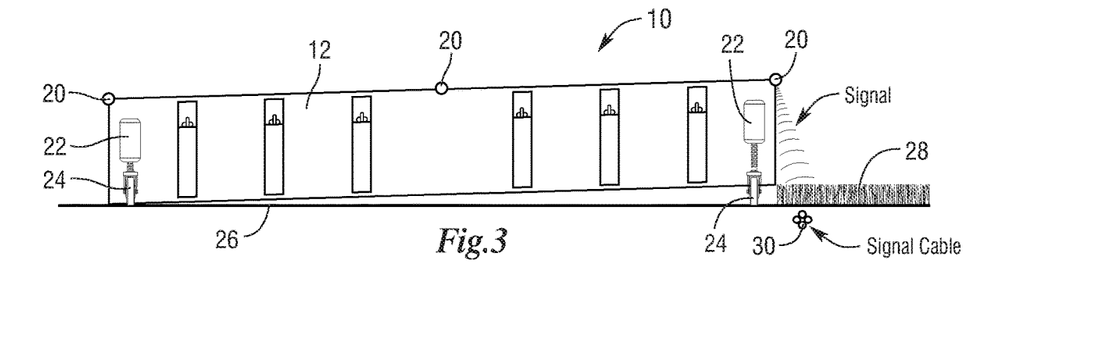
FIG. 3 is another rear elevational view of the snow plow device of FIG. 2, wherein one end of the non-articulated plow blade has been lifted to avoid an obstruction.

In FIGS. 2 and 3, a straight non-articulated plow blade assembly 10 that includes outboard vertical orientation mechanisms is illustrated. As shown in these figures, mounted on the back side and inset from both ends of the plow frame, and opposite the pushing surface, are two wheels 24 which in their non-operative positions are somewhat above the level of the inferior portion of the straight plow blade 12. Each wheel 24 is suspended from, and integral to, an electric motorized or hydraulic mechanism 22, which variably deploys the respective wheel 24 in a downward or upward position depending upon signals received from the transmitter 32. The resulting effect is to cantilever the corner of the plow blade 12 upward and over, for example, soft hazards such as the grass 28 at the parking lot boundary in FIG. 3.

In the illustrative embodiment, the wheel mechanisms 22, 24 inset from each end of the plow blade 12 function independently from the mechanism at the opposite end of the blade 12, although both may function simultaneously to raise the plow blade 12 completely from the supporting surface (i.e., the ground 26 in FIGS. 2 and 3).

As shown in FIG. 10, in the illustrative embodiment, the lifting mechanisms 22 at each end of the plow blade 12 connect through signal wires 114 travelling through the plow harness or otherwise to the control unit 78 in the cab of the truck. This would primarily allow for override, or for fine-tuning, of the otherwise automatic function of this portion of the device.

In the illustrative embodiment, each actuator or lifting mechanism 22 controls the orientation of the plow blade 12 of the snow plow device by lifting one end of the plow blade 12 so as to avoid damaging the boundary feature and/or obstruction disposed at the periphery of the area being plowed (e.g., to avoid damaging the grass 28 at the parking lot boundary in FIG. 3). As shown in the illustrative embodiment of FIGS. 2 and 3, a respective wheel 24 is disposed below, and connected to each actuator 22, and each actuator 22 and associated wheel 24 are disposed proximate to the one end of the plow blade 12. In the illustrative embodiment, the wheel 24 may include a tire. In alternative embodiments, a skid may be used rather than the wheel 24.

As illustrated in FIG. 3, the plow blade 12 is being raised at one end on the wheel 24 while the other end is on the supporting surface 26 or similarly raised upon a wheel 24. This is accomplished by the actuator or lifting mechanism 22, which is electrically motorized or hydraulic ram driven, and attached to the wheel 24 and operates independently from the actuator or lifting mechanism 22 at the opposite end of the plow blade 12. Also illustrated in FIG. 3 is the signal cable 30 buried under grass 28 emitting the appropriate signal, which is picked up by the receiver 20 mounted on the plow blade 12 resulting in the raising of the proximate end of the plow blade 12 to mitigate damage.

Figure 1A:
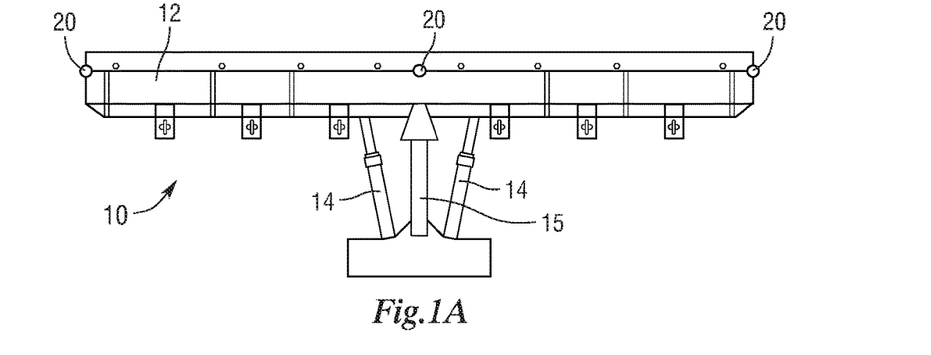
FIG. 1A is a top plan view of a snow plow device with receiver antennae at each end, and in the middle, of a straight non-articulated plow blade, according to one illustrative embodiment of the plow collateral damage mitigating system.

In FIG. 1A, a straight non-articulated plow blade assembly 10 that includes an inboard vertical orientation mechanism is illustrated. Referring to this figure, the hydraulic actuators 14 may be configured to control the orientation of the plow blade 12 by alternately lifting the respective ipsilateral corners of the plow blade 12 so as to avoid damaging the boundary feature and/or obstruction disposed at the periphery of the area being plowed. They may work in conjunction with hydraulic actuator 15, of which there are many configurations including the one illustrated, which raises and lowers the entire plow blade 12.

Figure 1B:
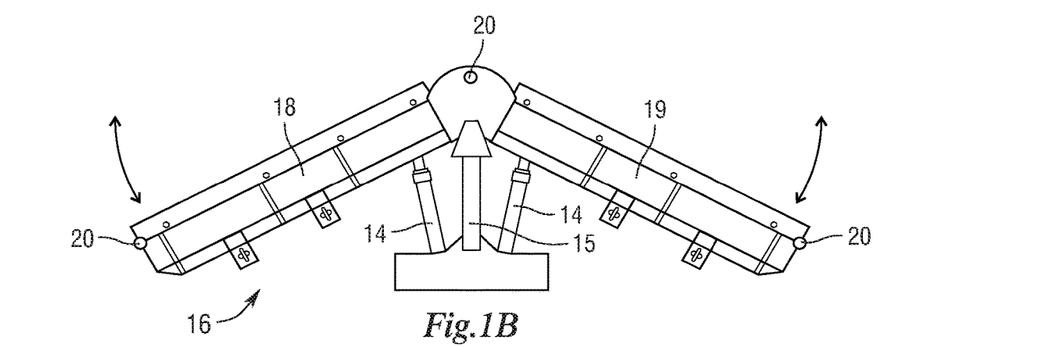
FIG. 1B is a top plan view of another snow plow device with receiver antennae at each end of an articulated plow blade as well as a receiver antenna at the middle portion of the blade, according to another illustrative embodiment of the plow collateral damage mitigating system.

In FIG. 1B, an articulated plow blade assembly 16 that includes an inboard vertical orientation mechanism is illustrated. Referring to this figure, the hydraulic actuator 15 controls the orientation of the first and second plow blade sections 18, 19 of the snow plow device by lifting the entire plow blade 18, 19 so as to avoid damaging the boundary feature and/or obstruction disposed at the periphery of the area being plowed.

By means of the hydraulic actuators 14, the inboard vertical orientation mechanism depicted in FIG. 1A has the effect of alternately or simultaneously raising or lowering respective ipsilateral corners of the straight plow blade 12. The hydraulic actuators 14 in FIGS. 1A and 1B may be part of, or function in concert with, the hydraulic lift system 15 commonly employed on snowplows.

Also, as shown in FIGS. 1A and 1B, the receivers of the plow collateral damage mitigating system may be in form of receiver antennas 20 mounted on top of the plow blade 12 proximate to the ends of the plow blade 12, and in the middle of the plow blade 12. The receiver antennas 20 are configured to wirelessly receive the at least one signal conveyed by the at least one signal wire of the signal transmission cable 30.

2. Transverse Plane Orientation Mechanisms

Referring again to FIGS. 1A and 1B, the transverse plane orientation mechanisms of the straight non-articulated plow blade assembly 10 and the articulated plow blade assembly 16 will now be described. In FIG. 1A, the hydraulic actuators 14 are able to control the orientation of the plow blade 12 of the straight non-articulated plow blade assembly 10 by rotating the entire plow blade 12 in a transverse plane so as to avoid damaging the boundary feature and/or obstruction disposed at the periphery of the area being plowed. Similarly, in FIG. 1B, the hydraulic actuators 14 are able to control the orientation of the first and second plow blade sections 18, 19 of the articulated plow blade assembly 16 by rotating the first and second plow blade sections 18, 19 in a transverse plane so as to avoid damaging the boundary feature and/or obstruction disposed at the periphery of the area being plowed.

Figures 11A, 11B, 11C:
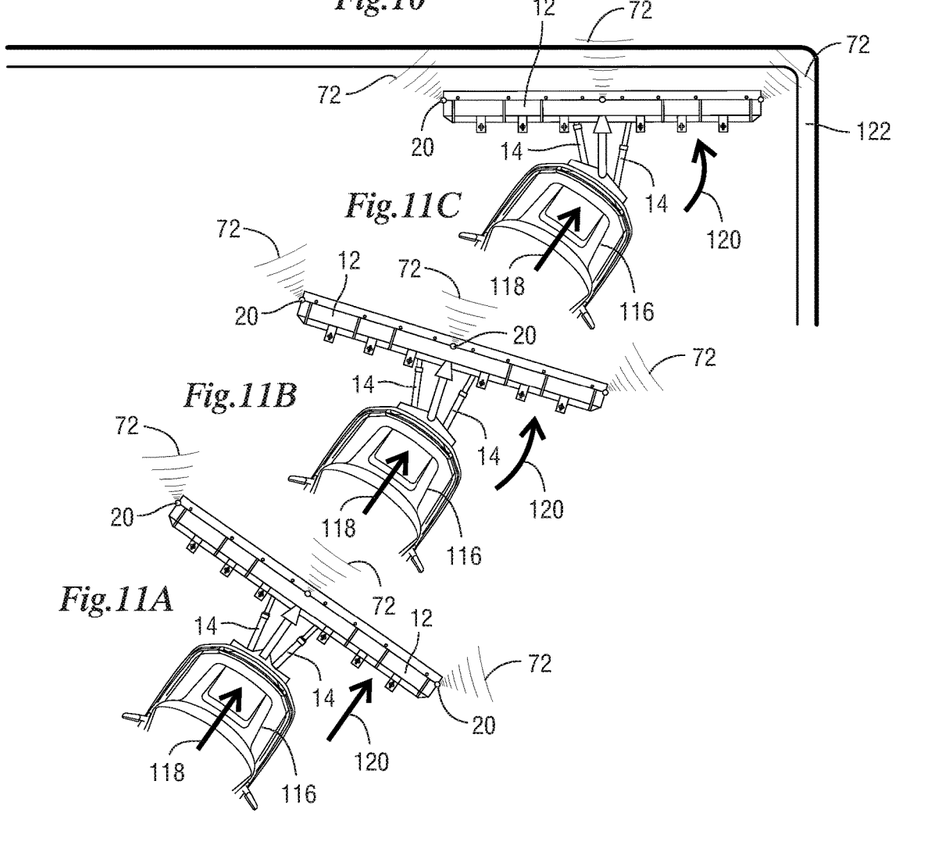
FIG. 11A illustrates a transverse plane orientation mechanism in a first stage of action with an oblique approach angle to a boundary, according to one illustrative embodiment of the plow collateral damage mitigating system.
FIG. 11B illustrates the transverse plane orientation mechanism of FIG. 11A in a second stage of action where the "squaring up" of the plow device has begun.
FIG. 11C illustrates the transverse plane orientation mechanism of FIG. 11A in a third stage of action depicting the resulting "squaring up" or parallelism resulting from automatic re-orientation to minimize damage from, in this case, the driver's side bottom corner of the blade to the bordering grass.

In the illustrative embodiment, functioning through the existing hydraulic system of the plow blade assembly 10, 16, the receivers 20 mounted upon the plow blade 12 or plow blade 18, 19 pick up the signal from the perimeter control devices (i.e., signal transmission cable 30 and signal transmitter 32) which are analyzed within the control unit 78 effecting pivoting changes to the blade 12 or blade 18, 19 turning it either clockwise or counterclockwise relative to the border or boundary of the plow surface in order to allow for orientation parallel with the boundary obstructions and hazards (e.g., as shown in FIGS. 11A-11C). The degree to which blade parallelism with boundary linearity is accomplished through this mechanism is roughly proportionate to the angle at which the blade 12 or blade 18, 19 is approaching the boundary. Therefore, if the blade 12 or blade 18, 19 is moving tangential to the boundary, there will be no effect on the transverse plane blade positioning. However, if the blade 12 or blade 18, 19 is approaching the boundary or obstacle at a more acute angle, this mechanism is progressively engaged.

3. Perimeter Control Devices

Figure 4:
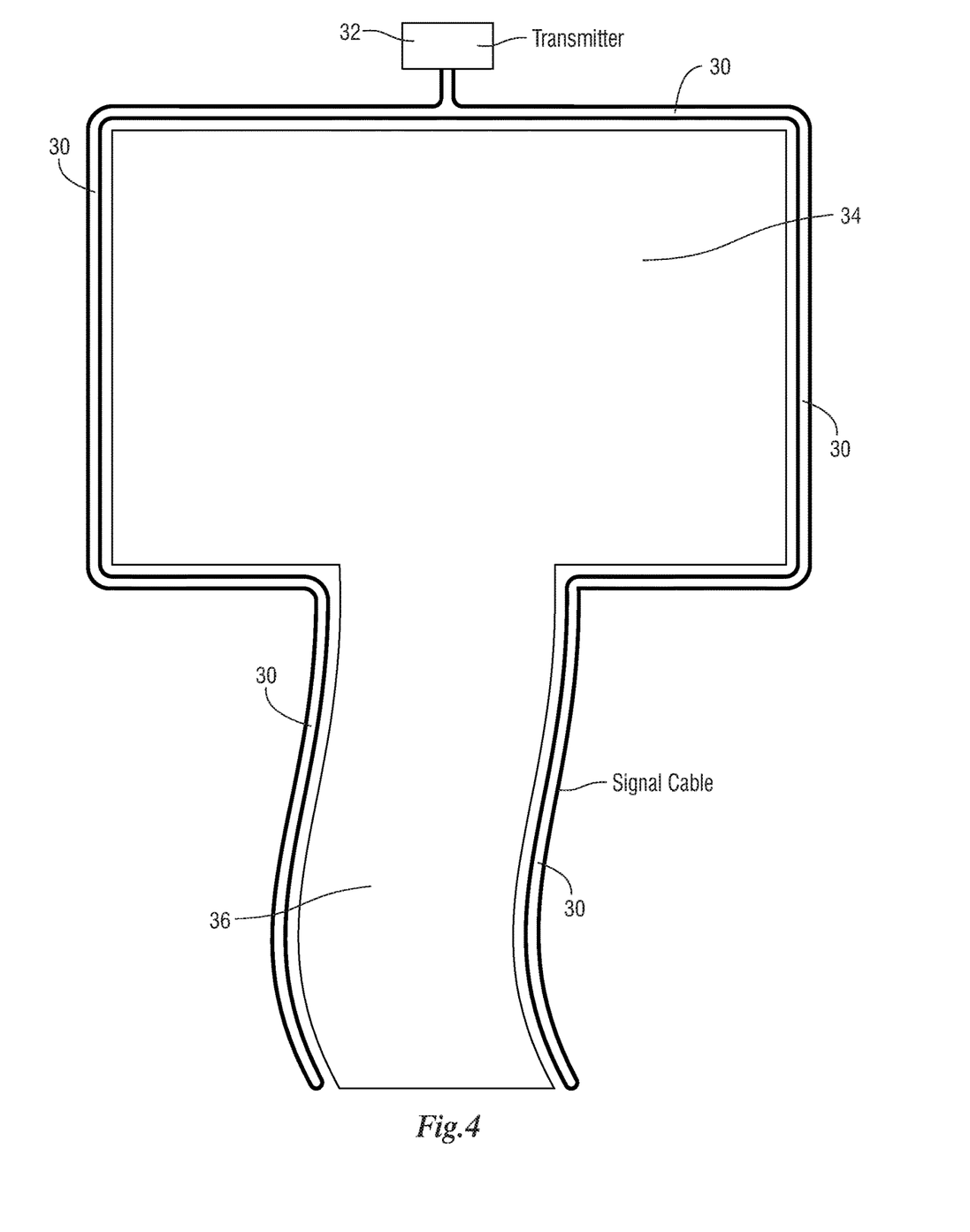
FIG. 4 is a top plan view illustrating the disposition of a signal cable around an area to be plowed, according to one illustrative embodiment of the plow collateral damage mitigating system.
Figures 5, 6, 7:
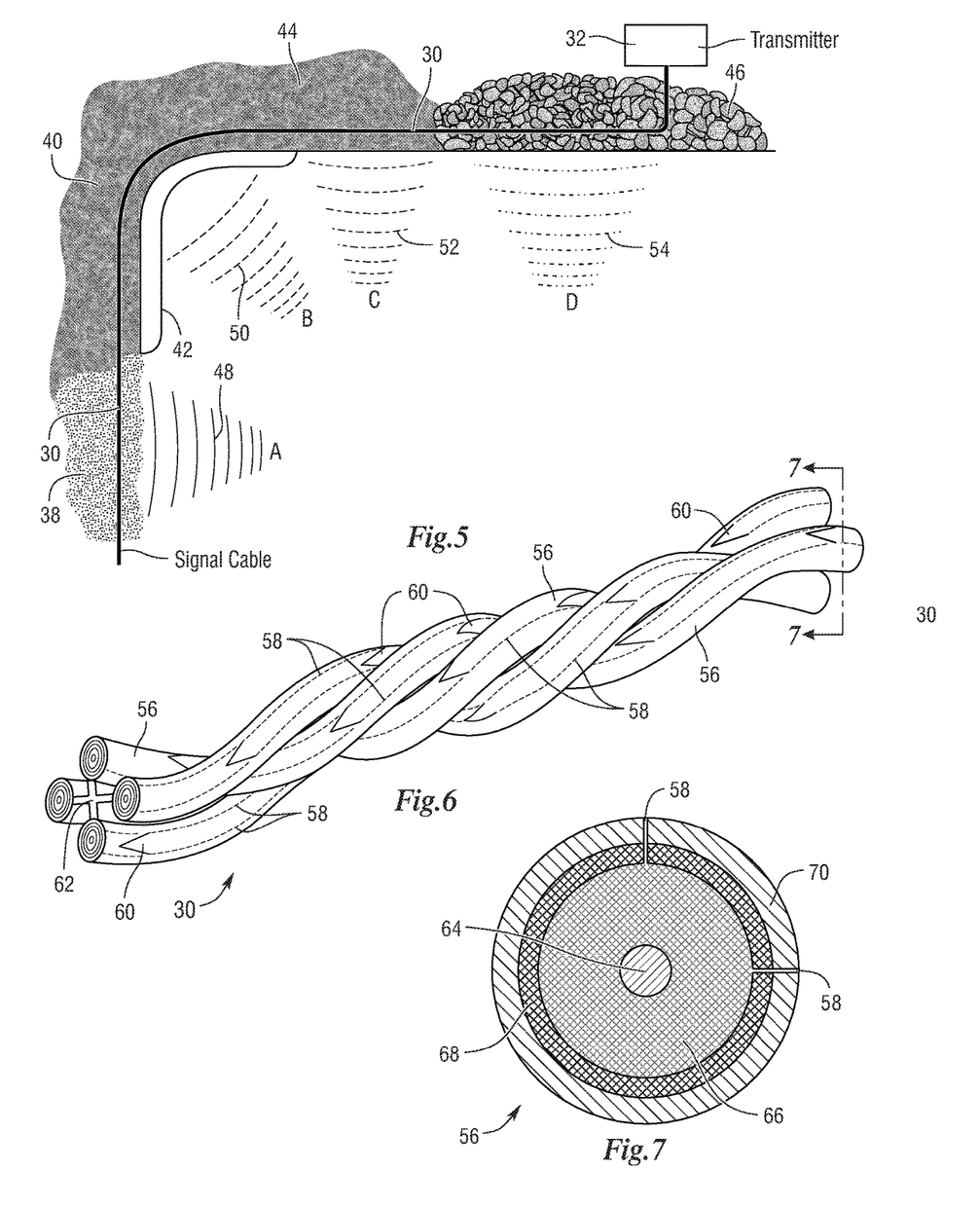
FIG. 5 is a diagram depicting a typical work site with various perimeter hazards illustrated including dirt (A), grass with a curb obstruction (B) and without a curb obstruction (C), as well as rock obstructions (D), and wherein a representation of different signals emitted from each segment of the signal cable, in order to trigger a different reaction from the current system, is also illustrated.
FIG. 6 is a perspective view of a plurality of signal transmission cables arranged in a helical bundle, according to one illustrative embodiment of the plow collateral damage mitigating system.
FIG. 7 is a sectional view cut through one of the signal transmission cables in the helical bundle, wherein the section is generally cut along the cutting-plane line 7-7 in FIG. 6.

With combined reference to FIGS. 4 and 5, it can be seen that perimeter control devices include a transmitter 32 operating at variable signal strengths and frequencies, which is connected to a power source and also to at least one portion of signal cable 30 with a signal wire of variable gauge and length positioned at or near the perimeter of the area to be plowed. Multiple signal wires and frequencies may be available and necessary depending upon the specific application in order to influence plow orientation, position, or elevation above the supporting surface, with the magnitude and velocity of lift dictated by the nature of any surrounding hazards, obstructions or landscape characteristics. Normally the signal wire is buried in order to prevent damage. The signal wire may be of multiple individual portions, possibly connected or bundled together in cross sectional fashion (see e.g., FIG. 6), with electromagnetic field (EMF) blocking external sheathing 70 (see FIG. 7) which may be color-coded depending upon the parameters of the various perimeter features to be protected. The sheathing 70 is torn away as the cable 30 is buried during installation, at intermittent locations and in segments of variable length, as necessary, in order to allow for adaptation to perimeter conditions as they linearly present. For example, with regard to the cable sheathing 70, the color code brown may be for perimeter dirt, green for perimeter grass, yellow for obstructions of curb height, and red for obstructions of substantially greater than curb height. Depending upon the individual signals transmitted within the cable 30, more than one signal wire may be exposed by removal of the external sheathing material 70 in order to induce multiple effects upon the plow blade mechanism. Not excluded is the possibility of, depending upon circumstances, any available aboveground perimeter signaling devices as well. Ultimately, the signals emitted by the transmitter 32 are picked up by receivers 20 mounted at both ends of the plow blade 12 and also in the middle of the plow blade 12.

FIG. 4 illustrates the disposition of the cable 30 around an exemplary area to be plowed (i.e., a parking area 34 with a driveway 36). In FIG. 4, it can be seen that the driveway 36 is curving whereas the parking area 34 is rectangular. A transmitter 32 is attached to the signal cable 30 that surrounds the periphery of the parking area 34 and driveway 36.

An illustrative embodiment of the signal transmission cable 30 used in the plow collateral damage mitigating system is illustrated in FIGS. 6 and 7. The signal transmission cable 30 is configurable so as to allow variable electromagnetic field emission along a length thereof. The signal transmission cable 30 is suitable for both aboveground and underground usage. As shown in the cross-sectional view of FIG. 7, each single signal transmission cable 56 in the cable bundle of FIG. 6 generally comprises at least one inner signal wire 64, the at least one inner signal wire 64 configured to convey a signal originating from the signal transmitter 32; a shielding layer 68 circumscribing the at least one inner signal wire 64, the shielding layer 68 configured to prevent an electromagnetic field (EMF) from escaping exteriorly from the signal transmission cable 56; and an outer protective layer 70 circumscribing the shielding layer 68, the outer protective layer 70 configured to prevent damage to the shielding layer 68 and the at least one inner signal wire 64. One or more portions of the outer protective layer 70 and the shielding layer 68 are configured to be selectively removed by a user so as to enable the electromagnetic field emanating from the signal transmission cable 56 to be varied. That is, the signal transmission cable 56 is capable of being modified to allow intermittently variable EMF transmission along its length. In the illustrative embodiment, the signal transmission cable 56 may further comprise an intermediate insulation layer 66 disposed between the shielding layer 68 and the at least one inner signal wire 64.

As shown in the cross-sectional view of FIG. 7, a central wire 64 of variable gauge is surrounded by plastic insulation 66 with the next layer being an appropriate EMS blocking material 68, such as aluminum, followed by an outer layer of durable in-ground sheathing material 70. Also illustrated at 12 o'clock and 3 o'clock positions are representative detents 58 enabling the longitudinal removal of the outer two layers 68, 70 in segments, as necessary, during installation.

As shown in the illustrative embodiment of FIG. 6, the single signal transmission cable 56 may be arranged in a helical bundle forming a composite signal transmission cable 30 so that exposed signal wire electromagnetic field emissions are not significantly blocked by adjacent intact portions of the outer protective layer 70 and the shielding layer 68. In FIG. 6, it can be seen that the helical cable bundle may comprise one or more interconnecting struts 62 for maintaining respective cables 56 of the cable bundle in a constant cross-sectional position relative to one another. Also, in the illustrative embodiment, the interconnecting radially disposed struts or cross members 62 are longitudinally shaped in a twisting fashion to allow for a helical disposition of the wires relative to one another (see FIG. 6). In the illustrative embodiment, the interconnecting struts 62 may be formed from a durable plastic material. In one or more embodiments, the outer protective layer 70 of the signal transmission cable 56 may be continuous with the radially disposed interconnecting struts 62, which maintain the spatial relationship of the various components. In other words, the interconnecting struts 62 may be formed together with the outer protective layer 70.

In FIG. 6, an exemplary four-signal wire composite signal transmission cable 30 is illustrated. In this illustrative example, each component signal wire is attached to the other wires via struts 62 made from an underground durable material (e.g., a suitable polymeric material or plastic). As will be described in detail hereinafter, perforations 58 facilitate the removal of the outer portion of the underground plastic shield 70 and its aluminum inner layer 68, of variable linearity, along with tabs 60 for tearing away these same two layers 68, 70, are illustrated. Also illustrated is the helical nature of the cable 30 rotating on its long axis.

Now, referring again to the cross-sectional view of FIG. 7, the illustrative embodiment of the single signal transmission cable 56 will be described in further detail. In the illustrative embodiment, the inner signal wire 64 of the signal transmission cable 56 comprises copper. More specifically, the signal wire 64 may be made from variably-gauged copper surrounded by the insulation layer 66. The insulation layer 66 may be formed from plastic, and be of underground-durable quality. In other embodiments, rather than including a single signal wire 64, the signal transmission cable 56 may comprise a plurality of inner signal wires 64, wherein the plurality of inner signal wires 64 are circumscribed by the shielding layer 68. In these other embodiments, each of the inner signal wires 64 may be radially disposed and axially connected to one another.

In the illustrative embodiment, the shielding layer 68 of the signal transmission cable 56 comprises a metallic material. As shown in FIG. 7, the signal blocking metallic shield 68 is layered immediately inside of the external underground plastic shield 70. The shielding layer 68 completely encircles the signal wire 64, thus blocking the electromagnetic field (EMF) from escaping exteriorly from the signal wire 64 of the signal transmission cable 56. In the illustrative embodiment, the metallic material of the shielding layer 68 is aluminum.

In the illustrative embodiment, the outer protective layer 70 of the signal transmission cable 56 comprises a polymeric material or plastic. As shown in FIG. 7, the external plastic shield 70 completely encircles the inner signal blocking metallic shield 68. In the illustrative embodiment, the outer protective layer 70 is attached to the shielding layer 68 such that, when the one or more portions of the outer protective layer 70 and the shielding layer 68 are removed by the user, the one or more removed portions of the outer protective layer 70 and the shielding layer 68 are removed from the signal transmission cable 56 together as a unit. Referring collectively to FIGS. 6 and 7, the outer protective layer 70 comprises a plurality of perforations 58 extending longitudinally along the length of the signal transmission cable 56. The plurality of perforations 58 facilitate a removal of the one or more portions of the outer protective layer 70 and the shielding layer 68 from the remainder of the signal transmission cable 56. That is, the outer portion of the shield 70, relative to the central axis of the cable 56, has optimally spaced perforations 58 that allow for removal of longitudinal segments of the outer portion of the shield 70 along with the signal blocking metallic shield 68 to expose the inner signal wire 64 and allow escape of the electromagnetic field (EMF). In FIGS. 6 and 7, it can be seen that the perforations 58 are circumferentially spaced apart from one another on the outer periphery of the outer protective layer 70 so as to define a removable strip of the outer protective layer 70 (see FIG. 6). In other embodiments, rather than perforations 58, the outer protective layer 70 may comprise lines of weakness or indents for facilitating a removal of the one or more portions of the outer protective layer 70 and the shielding layer 68 from the remainder of the signal transmission cable 56.

Turning again to the illustrative embodiment of FIG. 6, it can be seen that the outer protective layer 70 further comprises a plurality of tabs 60 that are configured to be grasped by a user so as to facilitate a removal of the one or more portions of the outer protective layer 70 and the shielding layer 68 from the remainder of the signal transmission cable 56. To facilitate this removal, these tabs 60 can be lifted, and the outer protective layer 70 is able to be torn in a longitudinal direction to the desired length.

In the illustrative embodiment, the signal transmission cable 56 is omnidirectional with variable longitudinal EMF emission capabilities, which allows for automatic adaptation of the plow device depending upon perimeter hazards and obstructions. The transmitter 32 emits variable EMF along one or more wires 64, which are then allowed to pass to the plow device to influence its actions based upon perimeter conditions in conjunction with the selective removal of the outer EMF blocking sheath 70 and the shielding layer 68 along certain portions of the cable 56 at the time of in-ground installation. The illustrated tabs 60 allow for selective removal of the longitudinal sheath 70 and the shielding layer 68 along detents.

4. Control Module

Figure 9:
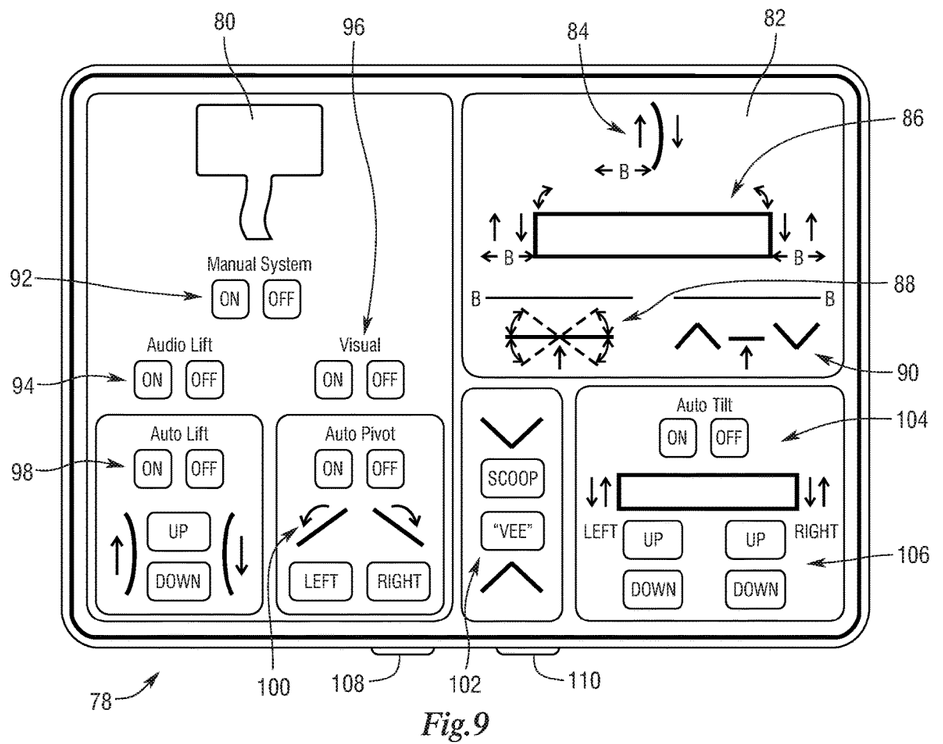
FIG. 9 is a representation of a display screen and control unit associated with one illustrative embodiment of the plow collateral damage mitigating system.

In the illustrative embodiment, with reference to FIG. 9, the plow collateral damage mitigating system comprises a control unit or control module 78 that is located in a cab of the vehicle on which the snow plow device is mounted. In the illustrative embodiment, the control module 78 performs monitoring and control functions for the system. More specifically, the control module 78 is where control of the hydraulics 14, 15 and all associated lift and manipulation mechanisms 22 are routed. Also, it is through this component 78 that the relative position of the plow versus the electronic boundary is visualized by the operator. Also visualized on the associated monitor, which may or may not be integral to the control module 78, may be color-coding or other visual cues associated with the cable 30 buried at the perimeter warning the operator as to the nature of proximate obstacles. In the illustrative embodiment, there also is the availability of an audio signal of variable volume, frequency and tone, which warns the driver of the proximity to any boundary obstruction or hazard near the surface to be cleared. As the receivers 20 detect increasing signal strength from the perimeter signal cables 30 and transmitter 32, interaction through the control module 78 calls for lifting of the plow blade off the supporting surface at the appropriate end (see FIG. 3), or both ends, or completely from the supporting surface, or transverse plane reorientation, as necessary. The control module 78 allows for active engagement or disengagement of any or all of the automatic functions associated with the current device. In the illustrative embodiment, there may also be a receptacle for a plug-in handheld plow controller.

As shown in FIG. 9, in the illustrative embodiment, the control unit 78 comprises a visual display device. The control unit may be configured to display a graphical representation of the site 80 being plowed in a first part of the visual display device. The control unit 78 may be further configured to display a graphical representation of the orientation of the plow blade of the snow plow device in a second part 82 of the visual display device. More specifically, as shown in FIG. 9, the second part 82 of the visual display device may contain a graphical representation of the plow end view 84, the plow top view 86, the plow degree of parallelism 88, and the shape 90 of the plow blade.

Referring again to the illustrative embodiment of FIG. 9, the control unit 78 may further comprise a plurality of control buttons 92, 94, 96, 98, 100, 102, 104, 106 for controlling the functionality of the plow blade of the snow plow device. For example, as shown in FIG. 9, the control unit 78 may include manual on/off buttons 92 for activating and deactivating manual operation of the system, audio on/off buttons 94 for activating and deactivating audial cues for the operator, and visual on/off buttons 96 for activating and deactivating visual cues for the operator. Also, it can be seen that the control unit 78 may further comprise a cluster of auto lift buttons 98, which include auto lift on/off buttons for activating and deactivating the auto lift operation of the snow plow device, and up/down buttons for manually raising and lowering the plow blade when the auto lift operational feature is turned off. Also, as shown in FIG. 9, the control unit 78 may further comprise a cluster of auto pivot buttons 100, which include auto pivot on/off buttons for activating and deactivating the auto pivot operation of the snow plow device, and left/right buttons for manually pivoting the plow blade when the auto pivot operational feature is turned off. In addition, the control unit 78 of FIG. 9 may further comprise plow shape button 102 for allowing the operator of the snow plow device to select either a scoop or "vee" shape for the plow blade. Finally, as shown in FIG. 9, the control unit 78 may further comprise a cluster of auto tilt buttons, which include auto tilt on/off buttons 104 for activating and deactivating the auto tilt operation of the snow plow device, and two sets of up/down buttons 106 for manually raising and lowering each of the opposed ends of the plow blade when the auto tilt operational feature is turned off.

In the illustrative embodiment, the visual display device or display screen of the control unit 78 may depict the plow blade 12 and its associated orientation as it relates to distance from the perimeter hazard as detected by the receiver 20 at either end of the plow 12, and the middle of the blade 12 as well. One portion of the screen may illustrate a representation of the plow 12 as it approaches a border with the end of the plow nearest the hazard progressively raised. Another portion of the screen may contain a representation of the plow 12 as it approaches a border hazard head on. The closer the blade comes to the perimeter hazard, the more it is elevated. Yet another portion of the screen may display a representation of the degree of parallelism, or lack thereof, of the blade 12 versus the boundary hazards or obstructions as demarcated by the cable 30 and associated signal being emitted therefrom. Yet another portion of the screen may indicate the shape of the plow blade as it approaches the border, whether scoop, V, or straight (see e.g., the shape 90 of the plow blade in FIG. 9). Control buttons and/or rocker switches are conveniently positioned below, to the side, or separately from, the display to allow for manipulation of the plow blade including selectively raising the left end of the blade, completely elevating or lowering the blade, changing the articulation of the blade, pivoting the blade from left to center to right, or selectively raising or lowering the right end of the blade (see e.g., control buttons 98, 100, 102, 104, 106 in FIG. 9). Also, switches allow for override of the mechanism, visual aid, audio aid, auto pivot, auto lift, V or scoop reshaping of the blade, and auto tilt or border-guard functions (see e.g., control buttons 92, 94, 96, 98, 100, 102, 104, 106 in FIG. 9). Also, due to the nature of signal 72 received by the antennae 20 mounted on the blade 12, the type of expected proximate obstruction or hazard may be displayed.

Turning again to the illustrative embodiment of FIG. 9, it can be seen that the control unit 78 may further comprises a harness plug-in port 108 for connecting to the wire harness of the snow plow device, and a handheld plug-in port 110 for connecting to a handheld plow controller.

In the illustrative embodiment, the control unit 78 of the plow collateral damage mitigating system is configured to operate both in a first automatic mode where the orientation of the plow blade of the snow plow device is controlled based upon the at least one signal of the signal transmission cable 30, and in a second manual override mode where the orientation of the plow blade of the snow plow device is able to be manually adjusted by an operator of the snow plow device (e.g., by selecting the "on" button of the manual system buttons 92 in FIG. 9).

Also, in the illustrative embodiment, the control unit 78 may be configured to identify the area that is to be plowed by Global Positioning System (GPS) coordinates of the area, to "learn" the shape of the area to be cleared of snow, and to display a graphical representation thereof on the visual display device (e.g., the graphical representation of the site 80 in FIG. 9).

Further, in the illustrative embodiment, the plow collateral damage mitigating system comprises a video output device (e.g., the visual display 80, 82 described above) configured to display at least one visual cue to the operator of the snow plow device regarding the boundary feature and/or obstruction disposed at the periphery of the area being plowed (e.g., the graphical representation of the site 80 in FIG. 9, which may also include a graphical representation of the plow device). Also, in the illustrative embodiment, the plow collateral damage mitigating system also comprises an audio-based output device configured to transmit at least one audial cue to an operator of the snow plow device regarding the boundary feature and/or obstruction disposed at the periphery of the area being plowed (e.g., the audial cues may be activated and deactivated by the audio on/off buttons 94 described above). In the illustrative embodiment, the control unit 78 is further configured to direct the video output device to display the at least one visual cue and/or the audio-based output device to transmit the at least one audial cue based upon the at least one signal of the signal transmission cable 30 so as to prevent the operator from damaging the boundary feature and/or obstruction disposed at the periphery of the area with the snow plow device. More specifically, in the illustrative embodiment, the control unit 78 is further configured to generate and display a graphical representation of the snow plow device and the area that is to be plowed on the visual display device to visually notify the operator as to the proximity of a plow blade of the snow plow device to the boundary feature and/or obstruction (e.g., the graphical representation of the site 80 in FIG. 9, which may also include a graphical representation of the plow device).

In the illustrative embodiment, the audio-based output device comprises a speaker device, and the control unit 78 is further configured to emit a sound of variable volume, frequency and/or tone from the speaker to audibly notify the operator as to the proximity of a plow blade of the snow plow device to the boundary feature and/or obstruction (e.g., the audial cues from the speaker may be activated and deactivated by the audio on/off buttons 94 of the control unit 78).

5. System Connections

In the illustrative embodiment, with reference to FIGS. 5 and 10, the perimeter control transmitter 32 is connected to the perimeter boundary cable 30, which is buried in-ground near the surface to be plowed. The signal wire(s) 64 of the perimeter boundary cable 30 serve as the transmission antennae for signals of varying strength and frequency which are picked-up by the receivers 20 mounted upon the plow blade 12 or 18, 19. The receivers 20 are connected via signal wire 112 running through the harness of the plow mechanism, which is connected to the monitor and control module 78 in the cab of the truck (see FIG. 10). The control module 78 in the cab is connected by signal wire 114 within the plow harness to the hydraulic or other mechanisms 22 in place to manipulate the plow (see FIG. 10).

6. System Functionality

With the current plow collateral damage mitigating system in its illustrative embodiment, and receiving appropriate signals from the boundary transmitting devices, the plow approaches the underground marking signal wires of cable 30 from which a predetermined boundary/obstruction/site-specific signal emanates, and is received at either end and/or the middle of the plow by receiver antennas 20 (see e.g., FIGS. 8A, 8B, and 11A-11C). If tangential to a boundary hazard of lower height, such as along a driveway bordered by grass or dirt, the appropriate end of the plow is raised by the vertical orientation mechanism displacing weight from the edge and corner of the plow nearer the signal wire, thus sparing the soft hazard from damage (see e.g., FIG. 3). Visualized on the screen in the cab of the vehicle, and with optional audio signal, would be the orientation of the blade and relative position to the boundary marker (see FIG. 9). This aids the driver in steering away from the hazard. The reaction of the plow mechanism is usually predetermined during set up of the current system as the signal wire is laid down in the ground, and as dictated by the perimeter conditions and hazards.

In FIG. 5, a diagram depicting an exemplary work site with various perimeter hazards is illustrated. The perimeter hazards in FIG. 5 include dirt 38, grass 40 with a curb obstruction 42, grass 44 without a curb obstruction, and rocks 46. FIG. 5 also represents the different signals 48, 50, 52, 54 emitted from each segment of the signal cable 30, in order to trigger a different reaction from the current system, based on the particular perimeter hazard. More specifically, as shown in FIG. 5, when the perimeter hazard is dirt 38, the signal cable 30 emits a first signal type 48. When the perimeter hazard is grass 40 with a curb obstruction 42, the signal cable 30 emits a second signal type 50. When the perimeter hazard is grass 44 without a curb obstruction, the signal cable 30 emits a third signal type 52. Finally, when the perimeter hazard is rocks 46, the signal cable 30 emits a fourth signal type 54. As such, in the illustrative embodiment, the plow collateral damage mitigating system is able to inform the plow operator as to the particular type of perimeter hazard encountered.

Figure 8A:
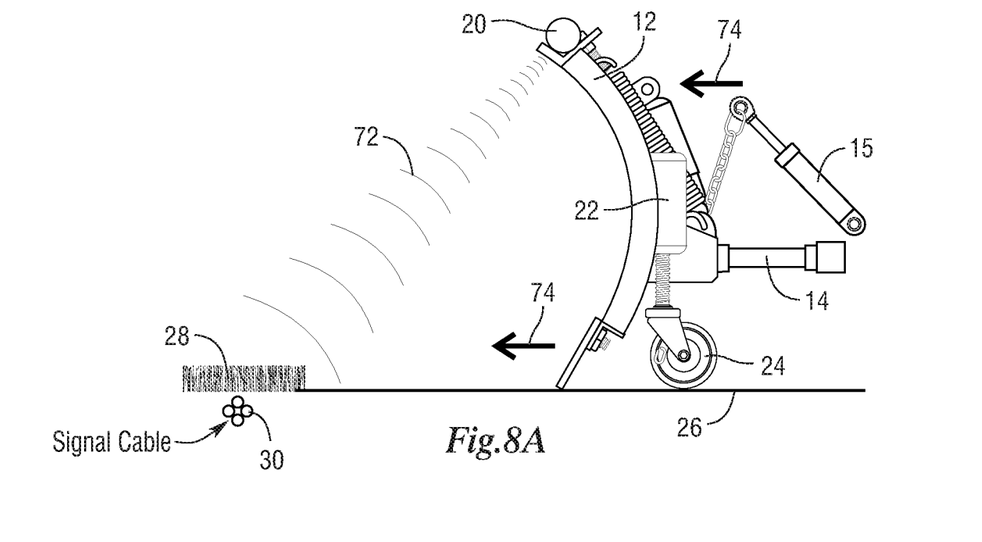
FIG. 8A is a side view of a plow blade approaching an area of grass under which is buried an omnidirectional signal cable from which is emitted a signal, according to one illustrative embodiment of the plow collateral damage mitigating system.
Figure 8B:
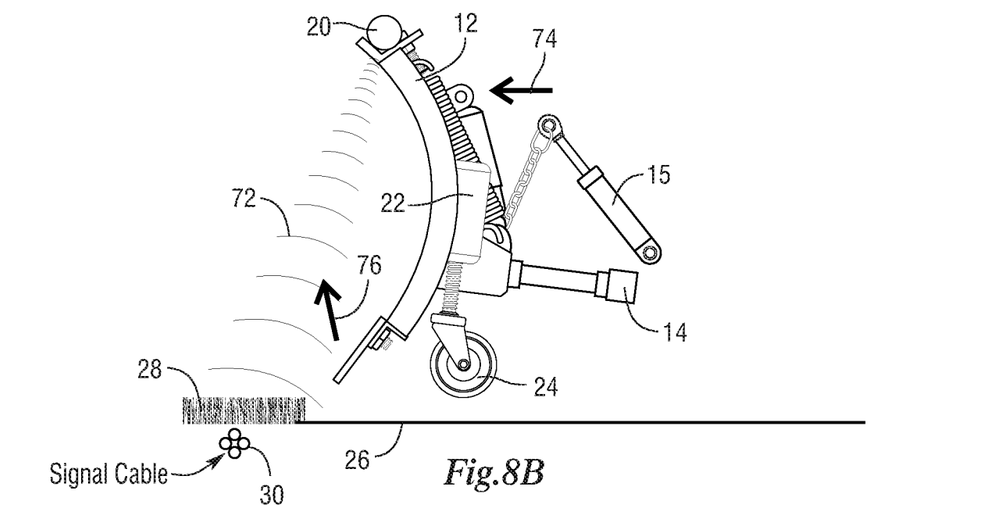
FIG. 8B is another side view of a plow blade of FIG. 8A, wherein, as the plow blade approaches the signal cable at approximately a 90° angle, the plow blade is lifted by a hydraulic mechanism in order to avoid damaging the grass.

In FIG. 8A, a plow blade 12 is approaching an area of grass 28 under which is buried an omnidirectional signal cable 30 from which is emitted a signal 72. The arrow 74 diagrammatically represents the direction of travel of the plow blade 12 in FIG. 8A. In FIG. 8B, as the plow blade 12 approaches the signal cable 30 at approximately a 90° angle, the plow blade 12 is lifted by a hydraulic mechanism 22 and/or hydraulic actuator 15 in order to avoid damaging the grass 28. The arrow 76 diagrammatically represents the lifting of the plow blade 12 in FIG. 8B. In FIGS. 8A and 8B, the receiver 20 of the signal 72 is at the upper portion of the plow blade 12.

On the other hand, if the plow 12 is being operated in an area where the approach to the boundary or hazard is generally more acute and closer to a 90° angle, and perhaps there is a hazard such as a curb 122 (e.g., as shown FIG. 11C), a different signal will be emanating from the previously selected (at the time of installation) perimeter signal wire resulting in raising of the entire plow blade by the inboard vertical orientation mechanism via the hydraulic system of the plow in order to clear the obstruction. Operation in this mode results in the plow blade 12 being raised so as to clear any boundary obstruction without causing damage to the equipment and/or hazard. Again, as visualized on the screen in the cab, the orientation of the blade 12 relative to the boundary can be monitored in order to mitigate collateral damage. Also operational is the transverse plane orientation mechanism, which will make the plow blade 12 closer to parallel with the boundary or hazard mitigating damage to, or from, either corner of the blade (see FIG. 11C).

One exemplary approach of the plow blade 12 to a boundary hazard (e.g., a curb 122) is illustrated in FIGS. 11A-11C. Initially, FIG. 11A illustrates a vehicle 116 with a plow 12 mounted thereon in a first stage of action with an oblique approach angle to the boundary curb 122. The directional arrow 118 diagrammatically represents the direction of travel of the vehicle 116, while the directional arrow 120 diagrammatically represents the direction of travel of the plow 12. In FIG. 11A, it can be seen that the signal 72 emanating from the signal transmission cable 30 along the boundary curb 122 is received by the receiver antennas 20 on the ends, and in the middle of the plow 12. FIG. 11B illustrates the vehicle 116 with the plow 12 mounted thereon in a second stage of action where the "squaring up" of the plow device 12 has begun (e.g., as diagrammatically indicated by the curved arrow 120). FIG. 11C illustrates the vehicle 116 with the plow 12 mounted thereon in a third stage of action depicting the resulting "squaring up" or parallelism resulting from automatic re-orientation to minimize damage from, in this case, the driver's side bottom corner of the blade 12 to the bordering grass and curb 122.

As a result of function within the logic circuit within the control module 78 and possibly via triangulation, the position of the plow blade 12 and its approach to the boundary can be analyzed for either tangential function or more acute angle orientation. This then has influence upon whether or not one end of the plow 12 or the other is raised, the entire blade 12 is raised by the hydraulic system and/or whether the blade 12 will be reoriented to be more parallel with the boundary. When approaching an area of signal transition from that indicating a low lying hazard to a higher obstruction such as a curb, the mechanism will generally default to reaction to the signal indicating the more substantial obstacle resulting in the appropriate elevation of the blade 12 from the supporting surface.

The illustrative embodiment also allows for loading of site-specific information into memory of the on-board control module 78 associated with the visualization screen with Global Positioning System (GPS) associated identification of the work site. This aids the operator with varying site-specific visualization of the work site layout and hazards (see e.g., the graphical representation of the site 80 in FIG. 9).

With the current system in its illustrative embodiment and receiving appropriate signals from the boundary transmitter 32, as the plow 12 approaches the obstruction/hazard/perimeter-marking signal wires in cable 30 (or other appropriate above-ground boundary marking system) from which the appropriate variable signal emanates and is received at either end and/or the middle of the snowplow 12 by the receiver antennas 20, the plow 12 is automatically manipulated and may be fine-tuned by the operator. The operator would actively lower the blade 12 for the next pass.

The illustrative embodiment allows for otherwise normal operation of the plow 12 moving at any angle to the electronically imposed boundary. For instance, if while plowing along a driveway the operator approaches too close to one side or the other, that particular portion of the plow 12 will be raised while the other end generally will not (e.g., as shown in FIG. 3). However, with variable signal strength and frequency from the perimeter control system, there may be incremental elevation of either end of the plow via the outboard vertical orientation mechanism 22 depending upon set-up of the device. Elevation of the plow blade 12 is variable at either end when taking into consideration the width of the plow 12, angle of the plow 12 relative to the perimeter of the surface to be plowed as marked by the perimeter control mechanism, direction of travel of the plow vehicle, the degree of angulation of an articulated blade 12 and characteristics and contours of the surrounding perimeter areas. Once the plow receivers 20 are back within the boundary perimeter, the outboard vertical orientation mechanism 22 cause(s) retraction of the outboard wheel at either or both ends of the plow blade 12.

The amount of elevation of either end of the plow, or the entire plow itself, or transverse plane reorientation of the blade 12, as well as the degree of buffer zone at the perimeter of the surface to be plowed and its effect upon vertical and transverse plane positioning of the plow as dictated by the perimeter control mechanism, would be infinitely variable, site-specific and stored within the memory of the cab control module 78 so that the overall operation of the device would be location-specific without any input necessary on the part of the plow operator after initial set-up and programming. In other words, the control module 78 of the plow collateral damage mitigating system is capable of being preprogrammed with variable boundary, hazard or obstruction-related plow blade control. For instance, the site to be plowed would simply be identified within the plow control module 78 via GPS coordinates, location of the module itself or the cell phone of the plow operator. The system would then be left in place and untouched from year-to-year allowing for increased efficiency and profit on the part of the plow operator. The system would likely be proprietary and offer advantages to both the manufacturer of the snowplow and associated systems as well as be beneficial for repeat year-to-year servicing of the site by the owner of that certain make of plow. The property owner benefits from the current device due to minimized collateral damage during snowfall season.

The screen on the control module 78 in the cab of the snowplow allows visualization of the electronic boundaries, hazards, obstructions and relative position of the plow and vehicle. This particularly facilitates the movement of the plow parallel or tangential to any features, which are to be avoided, particularly with a curved or complex driving area.

7. Alternative Embodiments of the System

Now, alternative embodiments of the plow collateral damage mitigating system will be described hereinafter. It is to be understood that the plow collateral damage mitigating system does not necessarily require the presence of every component described herein or those described below. Rather, the plow collateral damage mitigating system can be embodied in many different forms.

In one alternative embodiment, the plow collateral damage mitigating system functions entirely through the existing hydraulic lift system eliminating the wheels at either end of the plow. As the boundary for plowing is approached, the plow is lifted and pivoted incrementally through the action of the existing hydraulic lift mechanism.

In another alternative embodiment, the plow collateral damage mitigating system includes a separate visualization screen display more in the line of site of the plow operator away from the main control module 78 and/or heads-up display projected onto the windshield reflective of plow, boundary and work site conditions.

In yet another alternative embodiment, the plow collateral damage mitigating system allows for the exclusion or incorporation of any of the features included in the illustrative embodiment. For example, one may opt only for visualization cues as to proximity of the plow blade to the border, obstructions and hazards.

In still another alternative embodiment, the plow collateral damage mitigating system provides for an upgrade for existing plow systems. The wiring harness is connected to an upgrade-designed older-model-specific control module, which would use the existing hydraulics with retrofitted receivers mounted on the plow blade and signal wires brought back to the control module in convenient fashion. Audio signaling may be a part of this embodiment. The existing hand held controller, if there is one associated with the existing model, may or may not plug into, and may be accommodated by the control module. There may be accommodations for the addition of (tilting) vertical orientation mechanisms at either end of the blade.

In yet another alternative embodiment, the plow collateral damage mitigating system includes another hydraulic ram or other lifting mechanism disposed at either end of the plow blade, which vertically retracts a certain portion of the blade upward and away from the supporting surface to a varying degree and is mirrored by a similar mechanism operating independently at the other end of the blade.

In still another alternative embodiment, the plow collateral damage mitigating system allows for wireless connectivity through a smartphone in the possession of the operator, which individualizes operation of the current device and plow mechanism, worksite shape and location, and eliminates interference from adjacent plow sites.

In yet another alternative embodiment, the plow collateral damage mitigating system dispenses with the outboard vertical orientation mechanism as described above and, instead, allows for an axial re-orientation mechanism functioning at or near the base of the plow in the vicinity of its attachment to the vehicle, which induces a twisting force upon the plow blade raising one end or the other.

In yet another alternative embodiment, the plow collateral damage mitigating system includes its deployment upon municipal plow devices with a receiver mounted on at least the out-rigger or wing section of the plow, which generally clears the berm of the road. Upon reception of the appropriate signal along the roadway, such as from a buried cable or perhaps a battery-operated transmitter within the obstruction or hazard, the system allows audial cue, visual cue, and the option for automatic retraction of the outboard section of the plow away from the object to be protected, such as the lawn or mailbox of a roadside home.

In still another alternative embodiment, the plow collateral damage mitigating system allows for incorporation of appropriate features onto snow-blowers and all-terrain vehicle (ATV) plows.

It is readily apparent that the aforedescribed plow collateral damage mitigating system offers numerous advantages. First, the plow collateral damage mitigating system mitigates the damage to a site being plowed, particularly to surrounding lawn, landscaping features, and obstructions, as well as to the equipment itself. Secondly, the plow collateral damage mitigating system allows for variably automatic elevating, tilting, pivoting, or other mechanical manipulation of a plow blade attached to a vehicle. Finally, the plow collateral damage mitigating system allows for visual cues and/or audio cues for the operator to supplement and/or replace border/obstruction/hazard-marking devices, such as stakes that may be damaged or knocked down during the snow fall season.

Advantageously, the aforedescribed plow collateral damage mitigating system is automatic and operates electronically while requiring very minimal or no action on the part of the plow operator. Also, the plow collateral damage mitigating system requires minimal additional manipulation of switches or control buttons in order to mitigate collateral damage. Further, the plow collateral damage mitigating system compensates automatically for any landscape feature after appropriate setup. In the plow collateral damage mitigating system described above, the plow blade leading edge position is varied automatically in order to protect various obstacles and minimize damage to equipment. The plow collateral damage mitigating system functions to minimize damage to any hazard or obstruction, which may be encountered during snow removal processes.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A plow collateral damage mitigating system, comprising:
   a signal transmission cable configured to be disposed around a periphery of an area that is to be plowed by a snow plow device, the signal transmission cable including at least one signal wire, the at least one signal wire configured to convey at least one signal originating from a signal transmitter disposed in or proximate to the area;
   one or more receivers configured to be coupled to the snow plow device or a vehicle on which the snow plow device is mounted, the one or more receivers configured to receive the at least one signal conveyed by the at least one signal wire of the signal transmission cable;
   at least one actuator controlling an orientation of a plow blade of the snow plow device; and
   a control unit operatively coupled to the one or more receivers and the at least one actuator, the control unit configured to automatically control the orientation of the plow blade of the snow plow device by means of adjusting the at least one actuator based upon the at least one signal of the signal transmission cable so as to avoid damaging a boundary feature and/or obstruction disposed at the periphery of the area being plowed.

2. The plow collateral damage mitigating system according to claim 1, wherein the at least one actuator controls the orientation of the plow blade of the snow plow device by lifting one end of the plow blade so as to avoid damaging the boundary feature and/or obstruction disposed at the periphery of the area being plowed.

3. The plow collateral damage mitigating system according to claim 2, further comprising a wheel disposed below, and connected to the at least one actuator;
   wherein the at least one actuator and the wheel are disposed proximate to the one end of the plow blade.

4. The plow collateral damage mitigating system according to claim 1, wherein the at least one actuator controls the orientation of the plow blade of the snow plow device by lifting the entire plow blade so as to avoid damaging the boundary feature and/or obstruction disposed at the periphery of the area being plowed.

5. The plow collateral damage mitigating system according to claim 1, wherein the at least one actuator controls the orientation of the plow blade of the snow plow device by rotating the entire plow blade in a transverse plane so as to avoid damaging the boundary feature and/or obstruction disposed at the periphery of the area being plowed.

6. The plow collateral damage mitigating system according to claim 1, wherein the signal transmission cable further comprises:
   a shielding layer circumscribing the at least one signal wire, the shielding layer configured to prevent an electromagnetic field from escaping exteriorly from the signal transmission cable; and
   an outer protective layer circumscribing the shielding layer, the outer protective layer configured to prevent damage to the shielding layer and the at least one signal wire;
   wherein one or more portions of the outer protective layer and the shielding layer are configured to be selectively removed by a user so as to enable the electromagnetic field emanating from the signal transmission cable to be varied.

7. The plow collateral damage mitigating system according to claim 6, wherein the signal transmission cable comprises a helical bundle of cables so that exposed signal wire electromagnetic field emissions are not significantly blocked by adjacent intact portions of the outer protective layer and the shielding layer.

8. The plow collateral damage mitigating system according to claim 7, wherein the outer protective layer of each cable in the helical bundle of cables is color-coded depending on the boundary feature and/or obstruction being protected; and
   wherein the boundary feature and/or obstruction is selected from a group consisting of: (i) dirt, (ii) grass, (iii) a curb, (iv) rocks, and (v) combinations thereof.

9. The plow collateral damage mitigating system according to claim 1, wherein the one or more receivers comprise one or more receiver antennas mounted on top of the plow blade proximate to at least one end of the plow blade or the middle of the plow blade, the one or more receiver antennas configured to wirelessly receive the at least one signal conveyed by the at least one signal wire of the signal transmission cable.

10. The plow collateral damage mitigating system according to claim 1, wherein the at least one actuator comprises a hydraulic actuator controlling the orientation of the plow blade of the snow plow device.

11. The plow collateral damage mitigating system according to claim 1, wherein the control unit is located in a cab of the vehicle on which the snow plow device is mounted.

12. The plow collateral damage mitigating system according to claim 1, wherein the control unit comprises a visual display device, the control unit is further configured to graphically display the orientation of the plow blade of the snow plow device on the visual display device.

13. The plow collateral damage mitigating system according to claim 1, wherein the control unit is configured to operate both in a first automatic mode where the orientation of the plow blade of the snow plow device is controlled based upon the at least one signal of the signal transmission cable, and in a second manual override mode where the orientation of the plow blade of the snow plow device is able to be manually adjusted by an operator of the snow plow device.

14. The plow collateral damage mitigating system according to claim 1, wherein the control unit comprises a visual display device, and the control unit is configured to identify the area that is to be plowed by Global Positioning System (GPS) coordinates of the area, and to display a graphical representation of the area that is to be plowed on the visual display device.

15. The plow collateral damage mitigating system according to claim 1, further comprising:
   at least one video or audio-based output device configured to display at least one visual cue or transmit at least one audial cue to an operator of the snow plow device regarding the boundary feature and/or obstruction disposed at the periphery of the area being plowed; and
   wherein the control unit is further configured to direct the at least one video or audio-based output device to display the at least one visual cue or transmit the at least one audial cue based upon the at least one signal of the signal transmission cable so as to prevent the operator from damaging the boundary feature and/or obstruction disposed at the periphery of the area with the snow plow device.

16. A plow collateral damage mitigating system, comprising:

a signal transmission cable configured to be disposed around a periphery of an area that is to be plowed by a snow plow device, the signal transmission cable including at least one signal wire, the at least one signal wire configured to convey at least one signal originating from a signal transmitter disposed in or proximate to the area;

one or more receivers configured to be coupled to the snow plow device or a vehicle on which the snow plow device is mounted, the one or more receivers configured to receive the at least one signal conveyed by the at least one signal wire of the signal transmission cable;

at least one video or audio-based output device configured to display at least one visual cue or transmit at least one audial cue to an operator of the snow plow device regarding a boundary feature and/or obstruction disposed at the periphery of the area being plowed; and a control unit operatively coupled to the one or more receivers and the at least one video or audio-based output device, the control unit configured to direct the at least one video or audio-based output device to display the at least one visual cue or transmit the at least one audial cue based upon the at least one signal of the signal transmission cable so as to prevent the operator from damaging the boundary feature and/or obstruction disposed at the periphery of the area with the snow plow device.

17. The plow collateral damage mitigating system according to claim 16, wherein the at least one video or audio-based output device comprises a visual display device, and the control unit is further configured to display a graphical representation of the snow plow device and the area that is to be plowed on the visual display device to visually notify the operator as to the proximity of a plow blade of the snow plow device to the boundary feature and/or obstruction.

18. The plow collateral damage mitigating system according to claim 16, wherein the at least one video or audio-based output device comprises a speaker device, and the control unit is further configured to emit a sound of variable volume, frequency and/or tone from the speaker to audibly notify the operator as to the proximity of a plow blade of the snow plow device to the boundary feature and/or obstruction.

19. The plow collateral damage mitigating system according to claim 16, wherein the one or more receivers comprise one or more receiver antennas mounted on top of the plow blade proximate to at least one end of the plow blade or the middle of the plow blade, the one or more receiver antennas configured to wirelessly receive the at least one signal conveyed by the at least one signal wire of the signal transmission cable.

\* \* \* \* \*